United States Patent [19]

Graves

[11] Patent Number: 4,568,730
[45] Date of Patent: Feb. 4, 1986

[54] POLYMERIZATION CATALYST

[75] Inventor: Victoria Graves, Crosby, Tex.

[73] Assignee: Exxon Research & Engineering Co., Florham Park, N.J.

[21] Appl. No.: 639,658

[22] Filed: Aug. 13, 1984

[51] Int. Cl.$^4$ .................... C08F 4/02; C08F 10/00
[52] U.S. Cl. .................... 526/159; 502/102; 502/109; 502/113; 502/118; 502/127; 502/133; 502/134; 526/114; 526/125; 526/169; 526/904; 526/906
[58] Field of Search ............... 502/109, 127, 129, 133, 502/134, 113, 118, 102; 526/125, 159, 904, 169

[56] References Cited

U.S. PATENT DOCUMENTS

| | | | |
|---|---|---|---|
| 3,817,970 | 6/1974 | Tamm et al. ........................ | 526/904 |
| 3,849,334 | 11/1974 | Frielingsdorf et al. ............... | 526/124 |
| 4,107,415 | 8/1978 | Giannini et al. .................... | 526/904 |
| 4,384,982 | 5/1983 | Martin ................................. | 526/125 |

*Primary Examiner*—Edward J. Smith
*Attorney, Agent, or Firm*—M. B. Kurtzman

[57] ABSTRACT

An olefin polymerization catalyst component produced by impregnating polyethylene with a pulverized solid olefin polymerization catalyst containing a Group 4b or 5b transition metal, for example a pulverized magnesium chloride containing titanium is impregnated in low molecular weight polyethylene by copulvering, then subjecting the impregnated polymer particles to shear in an inert medium at about the softening point of the polyethylene, which when used as a cocatalyst with an organoaluminum compound produces polymers of improved morphology having a more regular shape and higher bulk density than pulverized catalyst alone.

18 Claims, No Drawings

POLYMERIZATION CATALYST

BACKGROUND OF THE INVENTION

1. Field of the Invention

The present invention relates to a pulverized catalyst for use in the polymerization of alpha-olefins such as ethylene to obtain polymers of improved flow characteristics and higher bulk density and to the process of polymerizing alpha-olefins using the catalyst.

2. Related Art

It is well known that the alpha-olefins such as ethylene can be polymerized by contacting them under polymerization conditions with "Ziegler" type catalyst, i.e., a catalyst obtained by activating a Group 4b or 5b transition metal-containing catalyst component with a cocatalyst, e.g., a titanium compound activated with an organometallic compound. It is further known that the use of such catalyst particles provide "templates" for the formation of the polymer particles, the size and size distribution of such polymer particles being largely dependent upon the size and particle size distribution (PSD) of the catalyst being used. It is further known that the characteristic of the polymer, i.e., irregular morphology and wide particle size distribution are replicated in the polymer produced with the catalyst.

U.S. Pat. No 4,143,223 discloses the preparations of Ti containing catalyst by mechanically pulverizing a magnesium compound and organic ester and impregnating the resultant solid with $TiCl_4$ which was then used with an alkyl aluminum cocatalyst to polymerize an alpha-olefin.

With certain olefin polymerization catalysts, the growth of the catalyst itself from the original catalyst seeds can be controlled to yield products having a coarse structure (20 microns or larger) which makes these catalysts more easily handled. Thus, A. P. Haag and M. Weiner (U.S. Pat. No. 3,623,846, issued Nov. 30, 1971, assigned to Dart Industries, Inc.) described a process for controlling particle size during condensation and/or desublimation of a material such as titanium trichloride which may be used in the polymerization of alpha-olefins.

In another example as described in British Pat. No. 1,139,450, assigned to Shell Internationale Research Maatschappij, $TiCl_3$ catalysts are formed by controlled reduction of titanium tetrachloride with aluminum alkyls. These materials have a narrow PSD, and have an average diameter greater than 15 microns, and therefore are relatively easy to handle.

It is known that solid magnesium compounds mechanically pulverized with an organic ester and impregnated with a titanium compound produce a titanium containing catalyst component for use with organometallic compounds in Ziegler type polymerization of alpha-olefins and that the resultant polymers are highly stereoregular. However, pulverized catalysts are known to have irregular morphology and wide particle size distribution. Thus, polymer produced from these catalysts have poor flow properties and low bulk density as a result of the irregular particle size of the polymer.

U.S. Pat. No. 4,224,185 discloses solid catalyst particles of titanium halide are made into a form and shape that is easier to handle, without changing their surface area or adversely affecting their activity by "matting" the catalyst particles with a fibrillatable polymer by mechanical shearing action and subsequently shaping the "mat", followed by controlled sizing and shaping into the form of pellets, tablets, and the like by known mechanical means. U.S. Pat. No. 4,220,555 discloses a similar composition with the difference that a non fibrillatable polyolefin is also employed.

British Patent Specification No. 871,828 discloses the preparation of alpha-olefin polymerization catalyst by polymerizing an alpha-olefin with a titanium trichloride and comminuting the resultant reaction mixture to produce catalytically active particles.

According to the present invention it has been found that particulate Group 4b or 5b transition metal containing catalyst (preferably pulverized), impregnated in solid polyethylene and subjected to conditions of shear at the softening point of the polyethylene in an appropriate solvent, when used as a Ziegler type catalyst component, produces polymer powder of better flow and higher bulk density than conventional mechanically pulverized catalyst components.

An advantage of the present catalyst component is that the polymer powder replicated therefrom is of more regular morphology and even particle size distribution with less fines. A particular advantage is the handling of the bulk polymer powder is easier since it flows more easily and does not tend to clog or block equipment. A further advantage is that the regular particle size of the polymer powder provides a larger volume of particles in the same space than irregular sized particles (i.e., higher bulk density).

SUMMARY OF THE INVENTION

In one aspect, the present invention is an olefin polymerization catalyst component prepared under anhydrous conditions by (a) impregnating said particulate solid olefin polymerization catalyst (preferably pulverized) containing one or more Group 4b or 5b transition metals into solid low molecular weight polyethylene particles to form catalyst impregnated polyethylene particles;

(b) heating said catalyst impregnated polyethylene particles at about the softening point of said polyethylene under conditions of shear in a liquid in which said polyethylene is not soluble; and (c) recovering spheroidized catalyst impregnated polyethylene particles.

Preferably the catalyst component comprises a magnesium compound preferably stabilized with yttrium halide, scandium halide, organic ester or combinations thereof, said stabilization may be obtained by copulverizing the magnesium compound and the stabilizer compound(s), either individually, in sequence or in admixture when combinations are employed. Yttrium and scandium halides are preferred, and are incorporated into the magnesium compound before the other components of the catalyst, such as the transition metals. Preferably the catalyst contains titanium, vanadium or titanium and vanadium. In addition to titanium and/or vanadium, zirconium and hafnium may preferably be present.

The transition metals may be incorporated in to the catalyst component by copulverizing solid compounds thereof with the magnesium compound (stabilized or unstabilized) or by washing or otherwise contacting liquid compounds, e.g., $TiCl_4$, with the aforesaid magnesium compound.

The resulting catalyst is maintained under anhydrous conditions and is used with an organoaluminum cocatalyst to polymerize alpha olefins to produce free flowing powder.

DETAILED DESCRIPTION OF THE INVENTION

The magnesium compound used in this invention is preferably a compound containing a halogen or both a halogen and an organic group (including a member selected from hydrocarbon groups, alkoxy groups, aryloxy groups and acyloxy groups) which may further contain another metal such as aluminum, tin, silicon or germanium. The magnesium compound may be prepared by any method, and may also be a mixture of two or more such compounds. Examples of the magnesium compound are decomposition products of organic Mg compounds such as Grignard reagents. There can also be used complex compounds obtained by dissolving halogen containing magnesium compounds with or without other compounds soluble in acetone and ether, such as $Al(OR)_nX_{3-n}$ (in which R is a hydrocarbon group, X is a halogen atom, and n=0 to 3) or $GeCl_4$, in the aforesaid solvent, and then evaporating the solvent. Of the exemplified compounds, magnesium dihalides and their complex compounds are preferred. Examples of especially preferred magnesium compounds used in this invention are compounds of the formula $MgX^1X^2$ wherein $X^1$ is halogen and $X^2$ represents a member selected from halogen atoms, and the groups OR' in which R' is a group selected from the group consisting of alkyl groups, preferably alkyl groups containing 1 to 10 carbon atoms, cycloalkyl groups, preferably cycloalkyl groups containing 6 to 12 carbon atoms, and aryl groups, preferably a phenyl group optionally substituted by an alkyl group containing 1 to 4 carbon atoms. Specific examples include $MgCl_2$, $MgBr_2$, $MgI_2$, $MgF_2$, $Mg(OCH_3)Cl$, $Mg(OC_2H_5)Cl$, $Mg(On-C_4H_9)Cl$ and the like.

Preferably, the magnesium compound is as anhydrous as possible. For the convenience of use, it is advantageous to use the magnesium compound as a powder produced by ball milling or precipitation techniques having an average particle diameter of about 1 to about 50 microns. However since the catalyst is mechanically pulverizated when contacted with the polyethylene, larger particle sizes are also feasible.

The tetravalent titanium compounds employed in this invention include halides, alkoxyhalides, alkoxides, siloxyhalides, siloxides, aromatic ring complexes and chelate compounds of titanium such as titanium tetrachloride, titanium tetrabromide, titanium tetraiodide, ethoxytitanium trichloride, propoxytitanium trichloride, butoxytitanium trichloride, octoxytitanium trichloride, diethoxytitanium dichloride, dipropoxytitanium dichloride, dibutoxytitanium dichloride, triethoxytitanium monochloride, tripropoxytitanium monochloride, tributoxytitanium monochloride, phenoxytitanium trichloride, benzoyltitanium trichloride, dicyclopentadienyltitanium dichloride, tetraisopropoxytitanium, tetrapropoxytitanium, tetrabutoxytitanium, bis(triphenylsiloxy)titanium dichloride, titanium acetylacetonate and any mixtures thereof.

Suitable vanadium compounds include halides, oxyhalides, alkoxyhalides and alkoxides of vanadium such as vanadium tetrachloride, vanadyl trichloride, ethoxyvanadyl dichloride, propoxyvanadyl dichloride, butoxyvanadyl dichloride, diethoxyvanadyl dichloride, dipropoxyvanadyl dichloride dibutoxyvanadyl dichloride, tributoxyvanadyl and any mixtures thereof.

There may be other transition metals of Group 4b and 5b of the Periodic Table of Elements (Periodic Table is shown on the back cover of Handbook of Chemistry and Physics, 45th Ed., The Chemical Rubber Co., 1964), in addition to titanium and/or vanadium present in the catalyst composition, preferably zirconium and and hafnium. Suitable compounds of these additional transition metals include halides, alkoxyhalides, alkoxides and chelate compounds.

Suitable zirconium and hafnium compounds which can be employed herein include those represented by the empirical formula: $M(OR)_xX_y$, wherein M is Zr or Hf, each R is independently a hydrocarbyl group having from 1 to about 20, preferably 1 to about 10, carbon atoms, each X is independently a halogen atom, preferably chlorine or bromine, and x and y independently have values from zero to 4 with the value of x plus y being 4, such as zirconium tetrachloride, zirconium tetrabromide, ethoxytrichlorozirconium, diethoxydichlorozirconium, dibutoxydichlorozirconium, ethoxytrichlorozirconium, butoxytrichlorozirconium, tetraethoxyzirconium, tetrabutoxyzirconium, zirconium acetylacetonate, di(2-ethyl hexoxy) dichlorozirconium hafnium tetrachloride, hafnium tetrabromide, ethoxytrichlorohafnium, diethoxydichlorohafnium, dibutoxydichlorohafnium, ethoxytrichlorohafnium, butoxytrichlorohafnium, tetraethoxyhafnium, tetrabutoxyhafnium, hafnium acetylacetonate, di(2-ethyl hexoxy) dichlorohafnium and any mixture thereof.

The proportions of the foregoing components of the catalyst are such that the atomic ratios of the elements are:

Mg:Transition metal is from about 5:1 to about 100:1; preferably from about 10:1 to 80:1; more preferably 30:1 to 70:1.

Examples of the organic acid ester which may be used in this invention are (i) aliphatic carboxylic acid esters containing 2 to 40 carbon atoms, (ii) alicyclic carboxylic acid esters containing 7 to 20 carbon atoms, (iii) aromatic carboxylic acid esters containing 8 to 40 carbon atoms.

Specific examples of the esters (i) are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate or allyl acetate; primary alkyl esters of unsaturated fatty acids such as methyl acrylate, methyl methacrylate or n-butyl crotonate; and halogenated aliphatic monocarboxylic acid esters such as methyl chloroacetate or ethyl dichloroacetate.

Specific examples of the esters (ii) are methyl cyclohexanecarboxylate, ethyl cyclohexanecarboxylate, methyl methylcyclohexanecarboxylate, and ethyl methylcyclohexanecarboxylate.

Specific examples of the esters (iii) are alkyl benzoates in which the alkyl group is a saturated or unsaturated hydrocarbon group usually containing 1 to 8 carbon atoms, preferably 1 to 4 carbon atoms, such as methyl benzoate, ethyl benzoate, n- or i-propyl benzoate, n-, i-, sec- or tert-butyl benzoate, n- or i-amyl benzoate, n-hexyl benzoate, n-octyl benzoate, 2-ethylhexyl benzoate, vinyl benzoate, and allyl benzoate (preferably methyl benzoate and ethyl benzoate); cycloalkyl benzoates in which the cycloalkyl group is non-aromatic cyclic hydrocarbon group usually containing 3 to 8 carbon atoms, preferably 5 to 6 carbon atoms, such as cyclopentyl benzoate and cyclohexyl benzoate; aryl benzoates in which the aryl group is a hydrocarbon group usually containing 6 to 10 carbon atoms, preferably 6 to 8 carbon atoms in which halogen and/or an alkyl group with 1 to 4 carbon atoms may be bonded to the ring, such as phenyl benzoate, 4-tolyl benzoate, benzyl benzoate, styryl benzoate, 2-chlorophenyl benzoate, and 4-chlorobenzyl benzoate and the like.

The yttrium halide and scandium halide may be yttrium bromide, yttrium chloride, scandium bromide or scandium chloride. Generally from about 0.5 to 3 weight percent based on the weight of catalyst, preferably 1 to 2 weight percent of one or more of these compounds may be incorporated into the magnesium compound.

The catalyst as described is enbedded in or impregnated into the polyethylene. This may be achieved by copulverizing the catalyst and the polyethylene. It is believed that the pulverizing drives the harder catalyst particles in to the softer polyethylene. In the heating and shearing step the further softened polyethylene substantially encapsulates the catalyst particle(s) associated with each polyethylene particle and by surface tension tends to form a sphere. The shearing action and the inert solvent prevent the agglormeration of the polymer particles, as well as the use of a temperature at about the softening point of the polymer but below its melting point. The polyethylene comprises from about 20 to 300 weight percent, preferably about 50 to 150 weight percent of the polymerization component of the present invention, which is obtained by conducting the impregnation with the catalyst and polyethylene in the appropriate weight ratios.

The mechanical pulverization is carried out using a ball mill, a vibratory mill, or impact mill or the like preferably in the substantial absence of oxygen or water.

The "mechanical pulverization (or copulverization)", as used in this application, denotes pulverization which imparts a violent pulverizing effect to a material, and excludes such means as mere mechanical stirring.

The shearing (mixing) action is done mechanically in an inert liquid, that is, a liquid in which the polyethylene is substantially insoluble, in any one of a number of well known commercially available pieces of equipment such as an autoclave with high speed agitator, or glass kettles fitted with baffles and a high speed stirrer. This mechanical shearing is performed for a time sufficient to form spheroidal particles of the catalyst impregnated polyethylene, usually from about 0.5 to about 60 minutes with the preferable period from 20 to 40 minutes. The shearing is carried on at about the softening point of the polyethylene. The combination of the shearing and the heat soften and shapes the catalyst impregnated polyethylene particles to spheroidal shapes thereby eliminating the irregular shapes of the untreated pulverized catalyst particles.

The polyethylene employed is preferably the lower molecular weight polyethylene generally from about 900 to 2000 number average molecular weight and preferably about 1200 to 1700 number average molecular weight having soften points of about 90° to 150° C. and preferably about 100° to 120° C.

The inert liquid in which the shearing of the catalyst impregnated polymer is carried out can be any of a large number of materials, for example, high molecular weight fluorinated hydrocarbons, liquid silanes such as polysiloxydioxane, tetraalkoxysilanes, tetraorganosilanes, polyalkoxysilanes, polydimethylsiloxanes (tri-methoxy terminated) and the like. The inert liquid is not critical, other than it not be a solvent for the polyethylene and that it not be a catalyst poison. Materials which would be vaporous at atmospheric pressure may be used under pressure to maintain the liquid phase and the necessary slurry for the shearing, for example, freons.

When yttrium halide or scandium halide are incorporated in to the magnesium compound catalyst, it is essential that they be copulverized with the magnesium compound as the first step in the process of preparing the catalyst component. Thereafter the solid copulverized Mg/Y or Sc solid may be contacted with transition metal compounds or esters with further copulverization to complete the catalyst or in the case of liquid materials such as $TiCl_4$ by washing the solid with the liquid. The additional catalyst components may be added sequentially or at one time, although sequential addition is preferred. The order of addition of the additional catalyst components is not critical.

Each copulverization may last from an hour to 48 hours, generally about 10 to 24 hours. The yttrium halide or scandium halide becomes an integral part of the support lattice of the magnesium compound serving, it is believed, to block reagglomerization of the small magnesium compound crystallites. This is believed to occur because of the similar crystal structure of these halides and magnesium compound which allows them (the Yttrium and/or Scandium halides) to occupy vacancies at the edges of the crystallites.

In a second aspect, the invention is a process for polymerizing at least one alpha-olefin under conditions characteristic of Ziegler polymerization wherein the catalyst of the present invention is employed as a cocatalyst with an organometallic compound containing aluminum. Preferred organoaluminum compounds have the empirical formula $AlR_{3-a}X_a$ wherein each R is independently hydrocarbyl as hereinbefore defined such as alkyl, X is a halogen and a is a number from 0 to 3. Suitable organoaluminum compound include trialkylaluminums such as $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum hydrides such as $Al(C_2H_5)_2H$ and $Al(i-C_4H_9)_2H$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$. The atomic ratio of Al:Transition metals may be in the range of 0.1:1 to 200:1, generally less than 50:1

In the polymerization process employing the present catalyst, polymerization is effected by adding a catalytic amount of the above catalyst composition and organoaluminum cocatalyst (catalyst system) to a polymerization zone containing alpha-olefin monomer, or vice versa. The polymerization zone is maintained at temperatures in the range from about 0° to about 300° C., preferably at slurry polymerization temperatures, e.g., from about 75° to about 110° C. (about 130° C. to 250° C. for solution polymerization), for a residence time of about a few seconds to several days, preferably 15 seconds to 2 hours. It is generally desirable to carry out the polymerization in the absence of moisture and oxygen with a catalytic amount of the present catalyst being within the range from about 0.0001 to about 0.1 millimoles titanium per liter of diluent. It is understood, however, that the most advantageous catalyst concentration will depend upon polymerization conditions such as temperature, pressure, diluent and presence of catalyst poisons, and that the foregoing range is given to obtain maximum catalyst yields in weight of polymer per unit weight of titanium. Generally the diluent is selected from paraffins and cycloparaffins having 3 to 30 carbon atoms. Suitable diluents include for example isobutane, isopentane, hexane, cyclohexane and the like.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization system to obtain better temperature control and to maintain uniform polymerization mixtures throughout the polymerization zone.

In order to optimize catalyst yields in the slurry polymerization of ethylene, it is preferable to maintain the total system pressure in the range of 100 to 200 psig. To achieve this ethylene is fed on demand.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The monomer or mixture of monomers is contacted with the catalyst system in any conventional manner, preferably by bringing the present catalyst system and monomer together with intimate agitation provided by suitable stirring or other means. Agitation can be continued during polymerization, or in some instances, the polymerization mixture can be allowed to remain unstirred while the polymerization takes place. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The catalysts are especially useful in gas phase polymerization utilizing fluidized polymer beds. The more uniform particle size and attrition resistance of the catalyst particles are a particular advantage in gas phase applications.

The polymer is readily recovered from the polymerization mixture by driving off unreacted monomer and/or diluent. No further removal of impurities is required.

The invention will be more clearly understood by reference to the following examples. These examples illustrate specific embodiments of the present invention and should not be construed to limit the invention in any way.

CATALYST PREPARATION

EXAMPLE 1

In a dry box 99 stainless steel balls ($\frac{3}{8}''$ diameter) were charged to a 230 ml jar followed by 10 g $MgCl_2$ and 1.02 g $YbCl_3$. The solids were milled on a roller mill for 16 hours. Ethyl benzoate (2.4 ml) was added to the jar and milling continued for 20 hours. The solid was then treated with neat $TiCl_4$ at 120° C. for four hours. The solid was washed several times with hexane until the solid was freed of excess $TiCl_4$.

EXAMPLE 2

In a dry box, a mill jar was charged with 99 stainless steel balls ($\frac{3}{8}''$ diameter). Eight grams of the catalyst of Example 1 was added to the jar along with 4 grams of Allied Chemical 617 PE (polyethylene MW 1500, Mehler drop point 102° C.). The mixture was milled for 5 hours. The contents of the jar were then discharged from the mill to a flask in the dry box. The flask was brought out of the dry box and 100 ml of a fluorinated high molecular weight hydrocarbon derivative used as a heat exchange medium (3M Fluorinert) was added. The slurry was stirred at 150 rpm and heated to 80° C. The slurry was held at 80° C. for three minutes and then allowed to cool to room temperature. The solid catalyst formulation was filtered, washed with hexane and dried. 7.77 grams of solid were recovered and had a very pale green color. The sample contained large well formed particles, as well as a small amount of fines.

POLYMERIZATION

Using the catalysts described in Examples 1 and 2, polymerization runs were made in a 1.6 liter stainless steel autoclave. 760 ml of hexane, mmoles hydrogen as indicated in the TABLE, 1.5 mmoles of triethylaluminum cocatalyst and mgs of the catalyst as indicated in the TABLE were added to the autoclave. The slurry was agitated using a stirrer speed of 1200 rpm and the temperature raised to 85° C. Ethylene was admitted to the reactor until a gauge pressure of 150 pounds was achieved. This pressure was maintained throughout the reaction by feeding ethylene continuously. The reaction was continued for forty minutes at which time the ethylene flow was terminated and the reactor vented to atmospheric pressure. The results of the reaction and polymer properties are reported in the Table.

The data in the Table show a decrease in productivity for the present catalyst (g PE/g cat × 0.66 hr) of 45% at the same hydrogen level. This is a favorable result since a productivity on the order of 3000 g PE/g cat × 0.66 hr is more applicable to a gas phase reactor than is the extremely high productivity (5000 g PE/g cat 0.66 hr) of the non-encapsulated catalyst. In addition to the improved morphology of the polymer products for the encapsulated catalyst, there is also a significant increase in bulk density (0.24 g/cc vs. 0.32 g/cc).

TABLE

| RUN # | mg, cat | mmoles H2 | Yield, g | MI | HLMI | MIR | Bulk Density gm/cc |
|---|---|---|---|---|---|---|---|
| Catalyst | Example 1 | | | | | | |
| A | 30 | 260 | 46.11 | 1.14 | 39.42 | 34.58 | 0.18 |
| B | 30 | 320 | 106.69 | 1.45 | 33.50 | 23.10 | 0.20 |
| C | 30 | 200 | 132.23 | 0.5 | — | — | 0.18 |
| D | 30 | 170 | 140.01 | 0.6 | — | — | 0.22 |
| E | 30 | 130 | 141.51 | 0.5 | 12.40 | 24.80 | 0.22 |
| F | 30 | 90 | 161.8 | 0.15 | 5.30 | 35.33 | 0.24 |
| Catalyst | Example 2 | | | | | | |
| G | 40* | 90 | 117 | 0.16 | 5.20 | 32.50 | 0.32 |

*60 mg solid - 40 mg catalyst based on 33 wt % PE present.

The invention claimed is:

1. An olefin polymerization catalyst component prepared under anhydrous conditions by
   (a) impregnating a particulate solid olefin polymerization catalyst containing one or more Group 4b or 5b transition metals into solid low molecular weight polyethylene particles to form catalyst impregnated polyethylene particles said polyethylene having a softening point in the range of 90°–150° C.;
   (b) heating said catalyst impregnated polyethylene particles at about the softening point of said polyethylene under conditions of shear in a liquid in which said polyethylene is not soluble; and
   (c) recovering spheroidized catalyst impregnated polyethylene particles.

2. The olefin polymerization catalyst component according to claim 1 wherein the particulate solid comprises a magnesium compound support.

3. The olefin polymerization catalyst component according to claim 2 wherein said magnesium compound has the formula $MgX^1X^2$ wherein $X^1$ is halogen and $X^2$ represents a member selected from halogen atoms, and the groups $OR'$ in which $R'$ is a group selected from the group consisting of alkyl groups containing 1 to 10 carbon atoms, cycloalkyl groups containing 6 to 12 carbon atoms and a phenyl group or phenyl group substituted by an alkyl group containing 1 to 4 carbon atoms.

4. The olefin polymerization catalyst component according to claim 3 wherein said magnesium compound is $MgCl_2$.

5. The olefin polymerization catalyst component according to claim 2 wherein said magnesium compound is copulverized with yttrium halide, scandium halide, organic ester or combinations thereof.

6. The olefin polymerization catalyst component according to claim 5 wherein said magnesium compound is copulverized with yttrium halide.

7. The olefin polymerization catalyst component according to claim 5 wherein said magnesium compound is copulverized with scandium halide.

8. The olefin polymerization catalyst component according to claim 5 wherein said magnesium compound is copulverized with organic ester.

9. The olefin polymerization catalyst component according to claim 6 wherein said yttrium halide is yttrium chloride.

10. The olefin polymerization catalyst component according to claim 9 wherein said magnesium compound is copulverized with ethyl benzoate.

11. The olefin polymerization catalyst component according to claim 1 wherein said transition metal compounds comprise a titanium compound, a vanadium compound, or a titanium compound and a vanadium compound.

12. The olefin polymerization catalyst component according to claim 11 wherein said transition metal compounds comprise a titanium compound.

13. The olefin polymerization catalyst component according to claim 12 wherein said titanium compound is selected from halides, alkoxyhalides, alkoxides, siloxyhalides, siloxides, aromatic ring complexes or chelate compounds.

14. The olefin polymerization catalyst component according to claim 10 wherein the transition metal compounds comprise $TiCl_4$.

15. The olefin polymerization catalyst component according to claim 1 wherein the particulate solid olefin polymerization catalyst containing one or more Group 4b or 5b transition metals is impregnated into said polyethylene by copulverizing said solid and said polyethylene.

16. The olefin polymerization catalyst component according to claim 1 wherein said particulate solid olefin polymerization catalyst containing one or more Group 4b or 5b transition metals is a pulverized material.

17. The olefin polymerization catalyst component according to claim 1 wherein said low molecular weight polyethylene has a number average molecular weight in the range of 900 to 2000.

18. A process for polymerizing at least one alpha olefin under conditions characteristic of Ziegler polymerization wherein the polymerization conducted in the presence of a catalyst comprising:
I. An olefin polymerization catalyst component prepared under anhydrous conditions by
   (a) impregnating a pulverized solid olefin polymerization catalyst containing one or more Group 4b or 5b transition metals into solid polyethylene particles to form catalyst impregnated polyethylene particles;
   (b) heating said catalyst impregnated polyethylene particles at about the softening point of said polyethylene and under conditions of shear in a liquid in which said polyethylene is not soluble; and
   (c) recovering spheroidized catalyst impregnated polyethylene particles and
II. an organoaluminum compound.

* * * * *